(12) United States Patent
Hamada et al.

(10) Patent No.: US 6,359,875 B1
(45) Date of Patent: Mar. 19, 2002

(54) CDMA RECEIVING APPARATUS

(75) Inventors: Hajime Hamada; Yasuyuki Oishi, both of Kawasaki; Hidenobu Fukumasa, Yanai; Koji Matsuyama, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/084,830

(22) Filed: May 26, 1998

(30) Foreign Application Priority Data

Oct. 23, 1997 (JP) .............................. 9-290729

(51) Int. Cl.⁷ .................... H04B 7/216; H04L 27/30
(52) U.S. Cl. .................. 370/342; 370/441; 375/140; 375/150; 375/152
(58) Field of Search ................... 370/206, 320, 370/342, 335, 441, 479, 203; 375/140, 142–143, 147, 149, 150, 152

(56) References Cited

U.S. PATENT DOCUMENTS 5,691,974 A * 11/1997 Zehavi et al. ............... 370/203
5,940,434 A * 8/1999 Lee et al. .................... 370/335
5,982,807 A * 11/1999 Snell .......................... 370/342
6,252,899 B1 * 6/2001 Zhou et al. .................. 375/140

* cited by examiner

Primary Examiner—Wellington Chin
Assistant Examiner—Maikhanh Tran
(74) Attorney, Agent, or Firm—Rosenman & Colin LLP

(57) ABSTRACT

A CDMA receiving apparatus receives a direct sequence CDMA signal produced through QPSK spreading modulation, performs coherent detection of the direct sequence CDMA signal, and despreads the signals, obtained through the coherent detection, through a despreading portion. The despreading portion comprises a selector portion. The selector portion selects signals as a demodulated and despread in-phase output signal and a demodulated and despread quadrature output signal, in accordance with despreading codes, from demodulated in-phase and quadrature signals obtained through the coherent detection, and an inverted in-phase and quadrature signals obtained as a result of the signs of the demodulated in-phase and quadrature signals being inverted.

5 Claims, 8 Drawing Sheets

CDMA RECEIVING APPARATUS

BACKGROUND OF THE INVENTION

1. Field of the Invention

The present invention relates to a CDMA (Code Division Multiple Access) receiving apparatus which receives and demodulates a direct sequence CDMA signal produced through QPSK (Quadrature Phase Shift Keying) spreading modulation.

In the DS-CDMA (Direct Sequence CDMA) method, as a modulating method, the BPSK (Binary Phase Shift Keying) method, or the QPSK method is selected. When the QPSK method is used, an in-phase signal and a quadrature signal undergo spreading modulation using different spreading codes, and are combined in a transmitting apparatus. The thus-produced signal is transmitted from the transmitting apparatus. A CDMA receiving apparatus demodulates the received signal into the in-phase signal and the quadrature signal, and despreading processing is performed on the in-phase signal and the quadrature signal using despreading codes which are caused to be in synchronization with the spreading codes, respectively. Reduction of the cost of such a CDMA receiving apparatus is demanded.

2. Descriptions of the Relate Art

FIG. 1 illustrates a CDMA receiving apparatus in the related art, and shows part of the CDMA receiving apparatus which uses the above-mentioned QPSK spreading modulation. As shown in FIG. 1, the CDMA receiving apparatus includes an antenna 51, a high-frequency amplifier 52, a bandpass filter 53, demodulators 54, 55, a carrier wave generator 56, a phase shifter ($\pi/2$) 57 for shifting the phase of a signal input thereto by $\pi/2$, A-D converters (A-D) 58 and 59, despreading portions 60, 61, 62 and 63, adders 64, 65, a fading compensating portion 66 and a determining and outputting portion 67.

The direct sequence CDMA signal, transmitted from a transmitting apparatus, obtained through the QPSK spreading modulation is input to the CDMA receiving apparatus through the antenna 51. The high-frequency amplifier 52 amplifies the thus-input signal. The bandpass filter 53 removes unnecessary frequency band components from the amplified signal. The carrier wave from the carrier wave generating portion 56 is input to the demodulator 54 directly and to the demodulator 55 via the phase shifter 57 which shifts the phase of the carrier wave by $\pi/2$, and, thus, coherent detection is performed through the demodulators 54 and 55 on the signal output from the bandpass filter 53. The thus-obtained signals are a demodulated in-phase signal and a demodulated quadrature signal, and are converted into digital signals through the A-D converters 58, 59, respectively. Then, the thus-obtained signals are input to the despreading portions 60, 61, 62 and 63. The despreading codes Ci, Cq, which are in synchronization with the spreading codes used in the transmitting apparatus as mentioned above, are input to the despreading portions 60, 61, 62 and 63. Thus, despreading processing is performed on the signals output from the A-D converters 58 and 59. The thus-obtained signals are added as shown in FIG. 1 through the adders 64 and 65. Thus, the in-phase signal and the quadrature signal are obtained. The in-phase signal and the quadrature signal are then input to the fading compensating portion 66 and the fluctuations of the signals occurring due to the fading in the propagation path are compensated. Then, determination processing is performed on the thus-obtained signals through the determining and outputting portion 67. Then, the received signal is output from the determining and outputting portion 67.

FIG. 2 illustrates a spreading QPSK modulating portion, and shows an arrangement of a portion for performing digital processing so as to obtain the direct sequence CDMA signal through QPSK modulation. Di and Dq represent an in-phase transmission information symbol and a quadrature transmission information symbol, respectively. Ci and Cq represent a spreading code for the in-phase signal and a spreading code for the quadrature signal, respectively. Si and Sq represent the in-phase signal and the quadrature signal obtained through spreading modulation, respectively. The in-phase transmission information symbol Di, the quadrature transmission information symbol Dq, and the spreading codes Ci and Cq for the in-phase signal and for the quadrature signal are input to exclusive OR circuits 71, 72, 73 and 74. Then, through level converting portions 75, 76, 77 and 78, for example, "0" is converted into "1" and "1" is converted into "−1". Then, the thus-obtained signals are added through adders 79 and 80. Then, the in-phase signal Si and the quadrature signal Sq are output. The transmitting apparatus forms a QPSK-modulated signal from the in-phase signal Si and the quadrature signal Sq, and transmits the QPSK-modulated signal.

FIG. 3 illustrates a general arrangement of a matched filter. Such a matched filter can be applied to a portion for the synchronization of the despreading codes and to each of the despreading portions 60, 61, 62 and 63 shown in FIG. 1. The arrangement of FIG. 3 includes one-chip-time delaying elements (D) 81-1 through 81-n, multipliers 82-0 through 82-n, and an adder 83. To this arrangement, a signal S is input. Further, to the multipliers 82-0 through 82-n, the despreading codes $C_0$ through $C_n$ are input, respectively.

When the matched filter comprising the above-described arrangement is applied to each of the despreading portions as mentioned above, the delaying elements 81-1 through 81-n form shift registers for shifting the input signal S every one chip time. The input signal S, the output signals of the shift registers and the despreading codes $C_0$ through $C_n$ are input to the multipliers 82-0 through 82-n, respectively, as shown in FIG. 3. The signals output from the multipliers 82-0 through 82-n are added through the adder 83. The output signal of the adder 83 is a despread and demodulated output signal for one symbol.

FIG. 4 shows a general arrangement of a sliding correlator. The sliding correlator can be applied to each of the despreading portions 60, 61, 62 and 63 shown in FIG. 1. The arrangement shown in FIG. 4 includes a multiplier 91, an adder 92, a one-chip-time delaying element (D) 93, and a switch 94 which is closed by a control signal SB, the period of which is the symbol period.

When the sliding correlator is applied to each of the despreading portions as mentioned above, the input signal S and the despreading code C are input to the multiplier 91 which performs multiplication thereof. The multiplication output signal output from the multiplier 91 and the addition output signal output from the adder 92, which has been delayed by the time for one chip through the delaying element 93, are input to the adder 92 which performs addition thereof. Thus, integration is performed during the period for one symbol. When the switch 94 is closed by the control signal SB, the despread demodulated output signal for one symbol can be obtained.

When the QPSK modulation method is applied to the direct sequence CDMA method, the spreading QPSK modulating portion in the transmitting apparatus can be embodied by, for example, using the arrangement shown in FIG. 2. In this case, by treating the operation (Di+jDq).(Ci+jCq) performed by the exclusive OR circuits 71, 72, 73 and 74 shown in FIG. 2 as multiplication of the complex spreading series, despreading can be performed by complex multiplication using the complex conjugate values of the complex despreading code series. However, when despreading is performed by the complex multiplication, because a multiplier is needed, the circuit scale is large, and/or, an amount of data processing for performing the calculation is large.

SUMMARY OF THE INVENTION

An object of the present invention is to reduce the circuit scale of the despreading portions or to reduce the amount of calculation performed by the despreading portions.

A CDMA receiving apparatus according to the present invention receives a direct sequence CDMA signal produced through QPSK spreading modulation, performs coherent detection of the direct sequence CDMA signal, and despreads the signals, obtained through the coherent detection, through a despreading portion 10. The despreading portion 10 comprises a selector portion 13. The selector portion 13 selects signals as a demodulated and despread in-phase output signal and a demodulated and despread quadrature output signal, in accordance with despreading codes, from demodulated in-phase and quadrature signals obtained through the coherent detection, and inverted in-phase and quadrature signals obtained as a result of the signs of the demodulated in-phase and quadrature signals being inverted.

The despreading portion may include:

an in-phase shift register for shifting the demodulated in-phase signal every chip period;

a quadrature shift register for shifting the demodulated quadrature signal every chip period;

selector means, each element thereof for having signals, output from a respective element of the in-phase shift register and a respective element of the quadrature shift register, and signals, obtained as a result of the signs of the signals output from the respective element of the in-phase shift register and the respective element of the quadrature shift register being inverted, input thereto, selecting signals, as a selected in-phase signal and a selected quadrature signal, therefrom, and outputting the thus-selected signals;

in-phase adding means for adding the selected in-phase signals and outputting the addition result as the demodulated and despread in-phase output signal; and quadrature adding means for adding the selected quadrature signals and outputting the addition result as the demodulated and despread quadrature output signal. Thus, the despreading portion can be formed by applying a matched-filter-type arrangement thereto.

The despreading portion may include:

selector means for having the demodulated in-phase signal and the demodulated quadrature signal, and an inverted in-phase signal and an inverted quadrature signal, obtained as a result of the signs of the demodulated in-phase signal and the demodulated quadrature signal being inverted, input thereto, selecting signals therefrom, as a selected in-phase signal and a selected quadrature signal, in accordance with the despreading codes, and outputting the thus-selected signals; and adding means for adding the selected in-phase signal and adding the selected quadrature signal during the period for one bit, and outputting the addition results as the demodulated and despread in-phase output signal and the demodulated and despread quadrature output signal. Thus, the despreading portion can be formed by applying a sliding-correlator-type arrangement thereto.

Other objects and further features of the present invention will become more apparent from the following detailed descriptions when read in conjunction with the accompanying drawings.

DETAILED DESCRIPTIONS OF PREFERRED EMBODIMENTS

Figure 5:
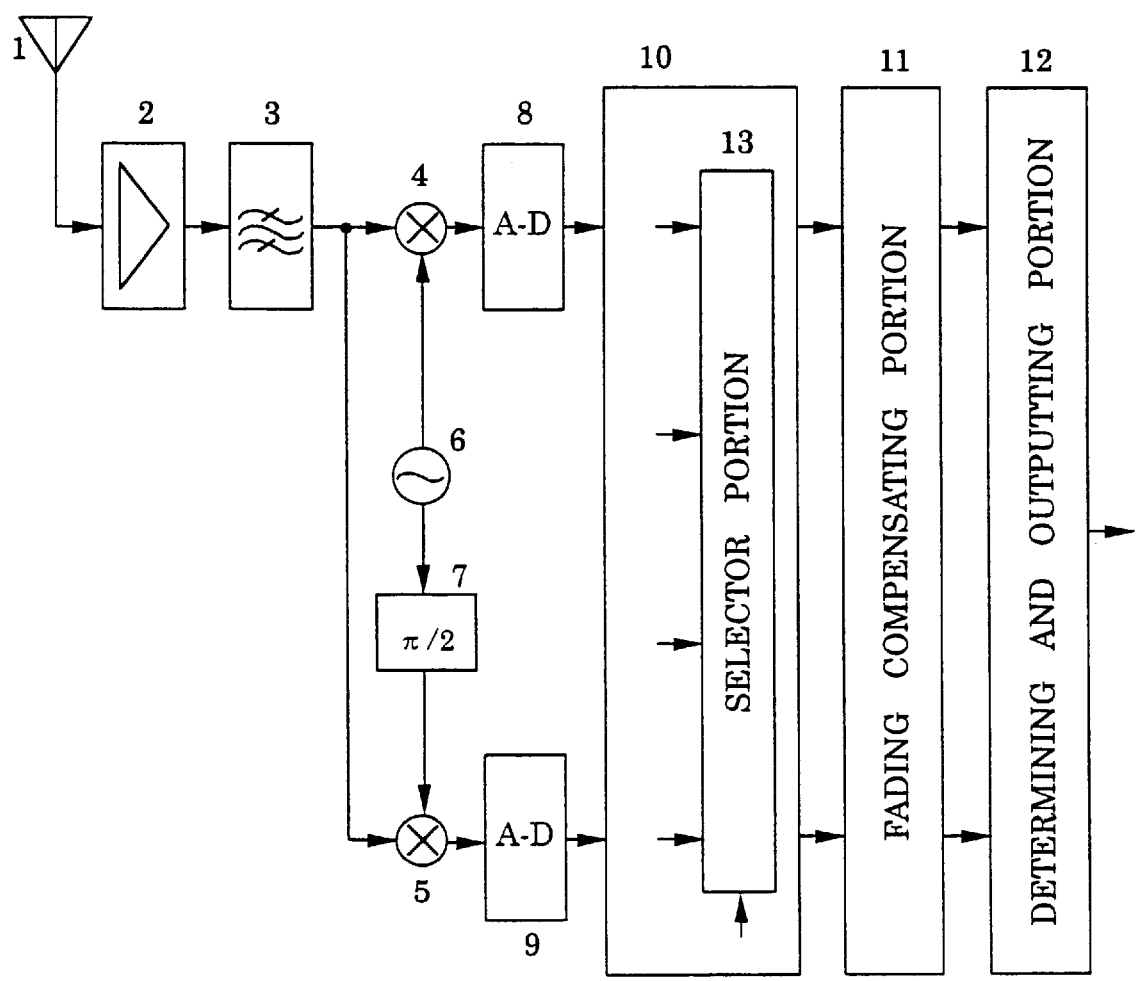
FIG. 5 illustrates a CDMA receiving apparatus in first and second embodiments of the present invention.

FIG. 5 shows a general arrangement of a CDMA receiving apparatus in a first embodiment of the present invention. The arrangement includes an antenna 1, a high-frequency amplifier 2, a bandpass filter 3, demodulators 4, 5, a carrier wave generating portion 6, a phase shifter ($\pi/2$) 7 for shifting the phase of an input signal by $\pi/2$, A-D converters (A-D) 8, 9, a despreading portion 10, a fading compensating portion 11, and a determining and outputting portion 12. The despreading portion 10 includes a selector portion 13.

Figure 1:
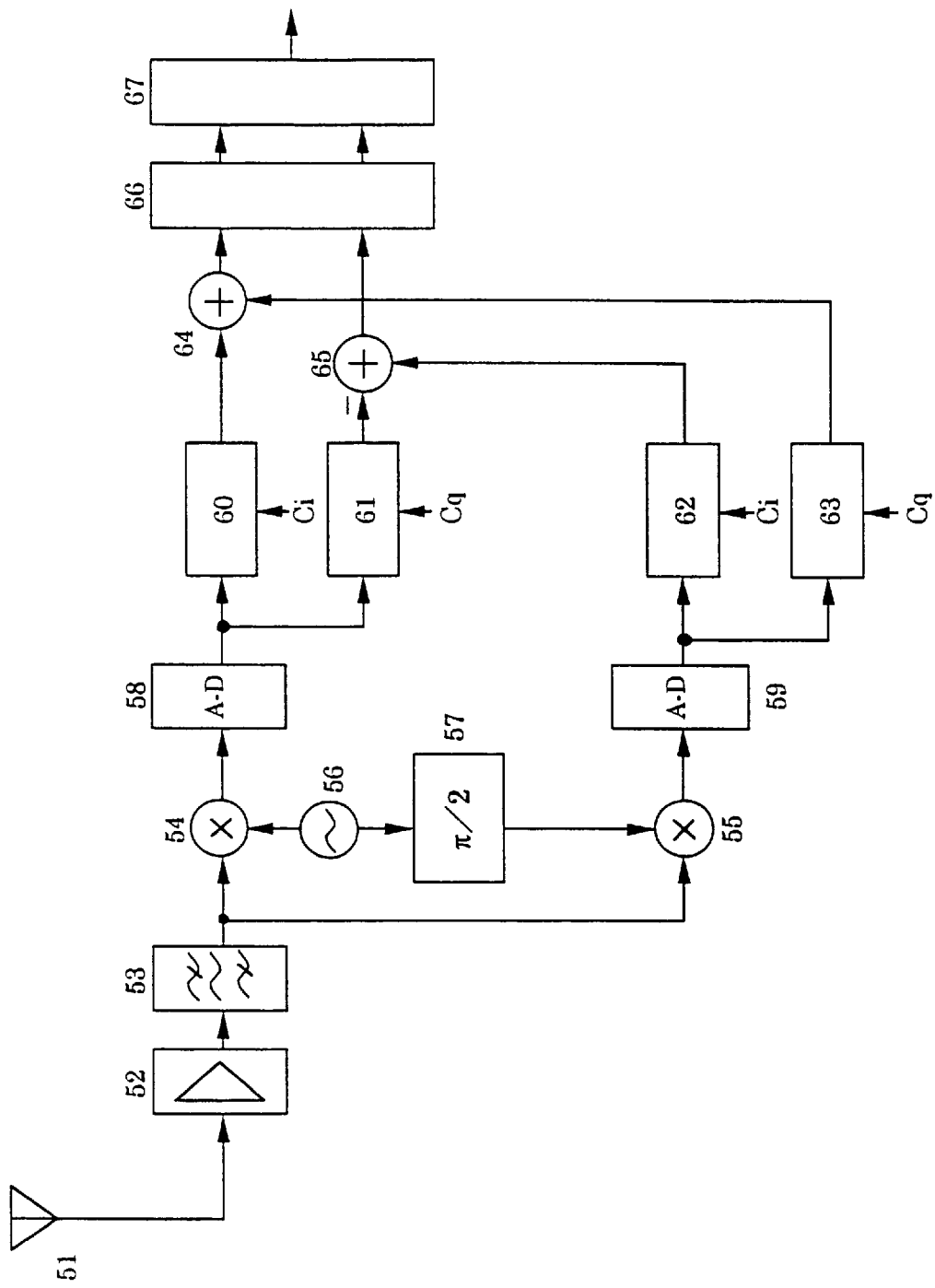
FIG. 1 illustrates a CDMA receiving apparatus in the related art.
Figure 2:
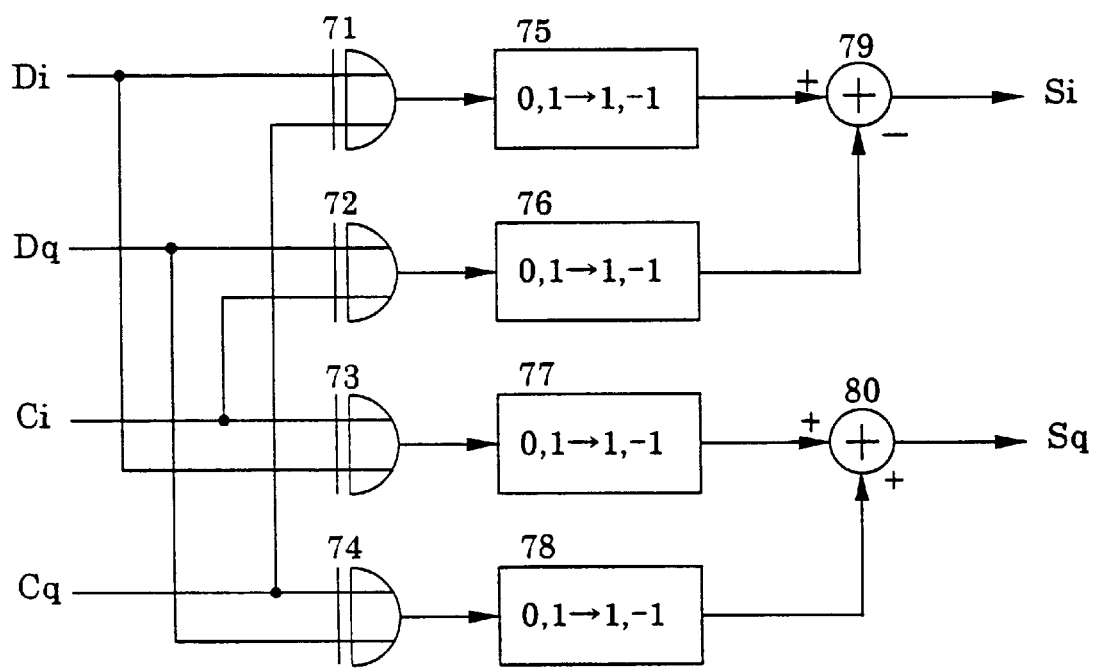
FIG. 2 illustrates a spreading QPSK modulating portion.
Figure 3:
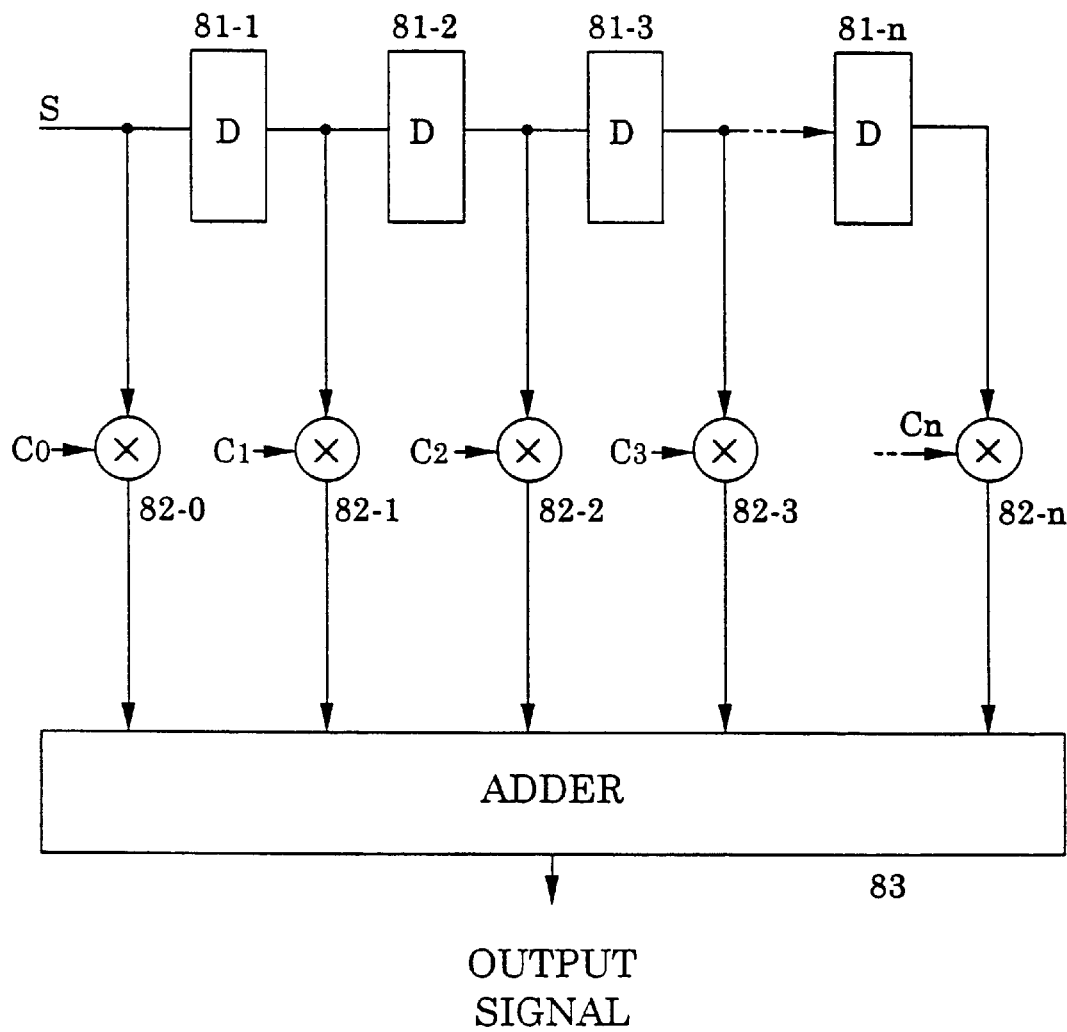
FIG. 3 generally illustrates a matched filter.
Figure 4:
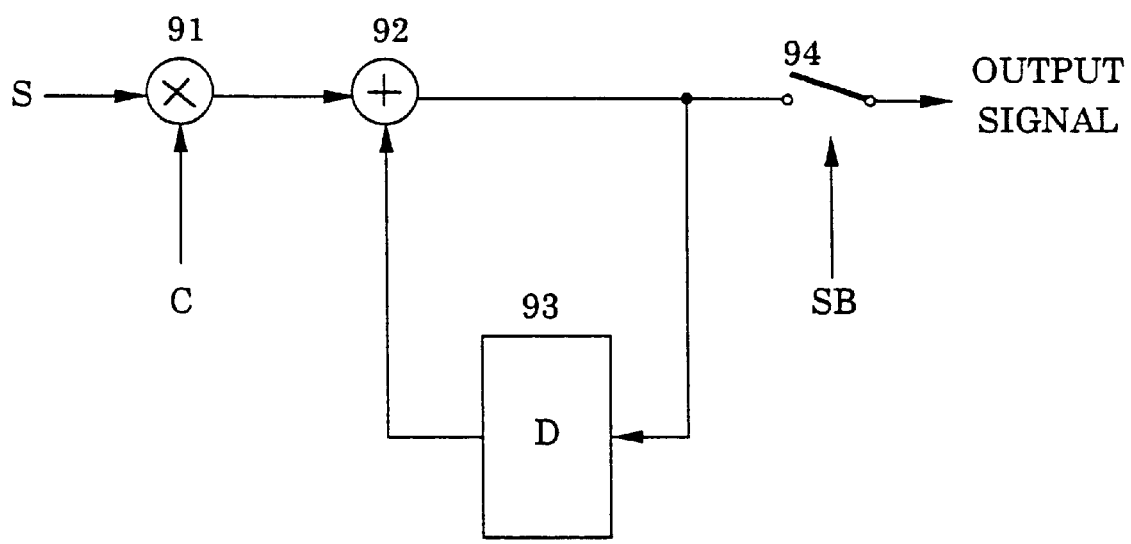
FIG. 4 generally illustrates a sliding correlator.

The arrangement and functions of parts from the antenna 1 through the A-D converters 8, 9 are similar to those of the related art shown in FIG. 1, and the duplicated descriptions therefor will be omitted. The despreading portion 10 including the selector portion 13 selects signals from among a demodulated in-phase signal and a demodulated quadrature signal, which are obtained as a result of A-D conversion through the A-D converters 8 and 9, and an inverted in-phase signal and an inverted quadrature signal, which are obtained as a result of inverting the signs of the demodulated in-phase signal and the demodulated quadrature signal, respectively. The selected signals are output from the despreading portion 10. The selection is performed in accordance with the despreading codes.

The spreading processing performed in the transmitting apparatus corresponds to multiplication of a complex information symbol $D_i+jD_q$ and a complex spreading code $C_i+jC_q$. Because the complex spreading code $C_i+jC_q$ is one of $1+j$, $1-j$, $-1+j$ and $-1-j$, the processing performed in the transmitting apparatus corresponds to rotation of the phase of the complex information symbol $D_i+jD_q$ by one of $\pi/4$, $-\pi/4$, $3\pi/4$ and $-\pi/4$. Accordingly, in the despreading processing, for each case where the complex spreading code $C_i+jC_q$ is one of $1+j$, $1-j$, $-1+j$ and $-1-j$, by rotating the phase of the complex information symbol $D_i+jD_q$ by the corresponding one of $-\pi/4$, $\pi/4$, $-3\pi/4$ and $3\pi/4$, the phase of the $D_i+jD_q$ can be returned to the original one. Thus, the despreading processing can be performed.

In this case, when adding $\pi/4$ to each of the phases $-\pi/4$, $\pi/4$, $-3\pi/4$ and $3\pi/4$, the phases $0$, $\pi J/2$, $-\pi/2$ and $\pi$ are obtained. As a result, the phase rotation processing corresponding to the despreading code can be easily performed. In this case, the phase of the despread output signal is that obtained as a result of rotating the phase of the correct despread output signal by $\pi/4$. However, the CDMA receiving apparatus includes the fading compensating portion 11 which compensates the phase rotation due to fading of the propagation path. Accordingly, by using the function of the fading compensating portion 11, it is easy to return the phase of the despread output signal, which has been rotated by $\pi/4$, to the phase of the correct despread output signal.

As a result of rotation of the phase of a vector $x+jy$ by 0, the vector remains $x+jy$. As a result of rotation of the phase of the vector $x+jy$ by $\pi/2$, the vector becomes $-y+jx$. As a result of rotation of the phase of a vector $x+jy$ by $-\pi/2$, the vector becomes $y-jx$.

As a result of rotation of the phase of a vector $x+jy$ by $\pi$, the vector becomes $-x-jy$. Thus, the despreading processing can be performed as a result of an exchange between the in-phase component and the quadrature component of the original vector $x+jy$ and/or inversion of the signs of these components. Accordingly, it is possible to form the despreading portion 10 by using sign inverting means and selecting means. The angle of the phase rotation to be performed on each of the phases $-\pi/4$, $\pi/4$, $-3\pi/4$ and $3\pi/4$ is not limited to $\pi/4$. It is also possible to perform phase rotation by $\pm(2n-1).(\pi/4)$ on each of the phases $-\pi/4$, $\pi/4$, $-3\pi/4$ and $3\pi/4$, where n is any integer.

Figure 6:
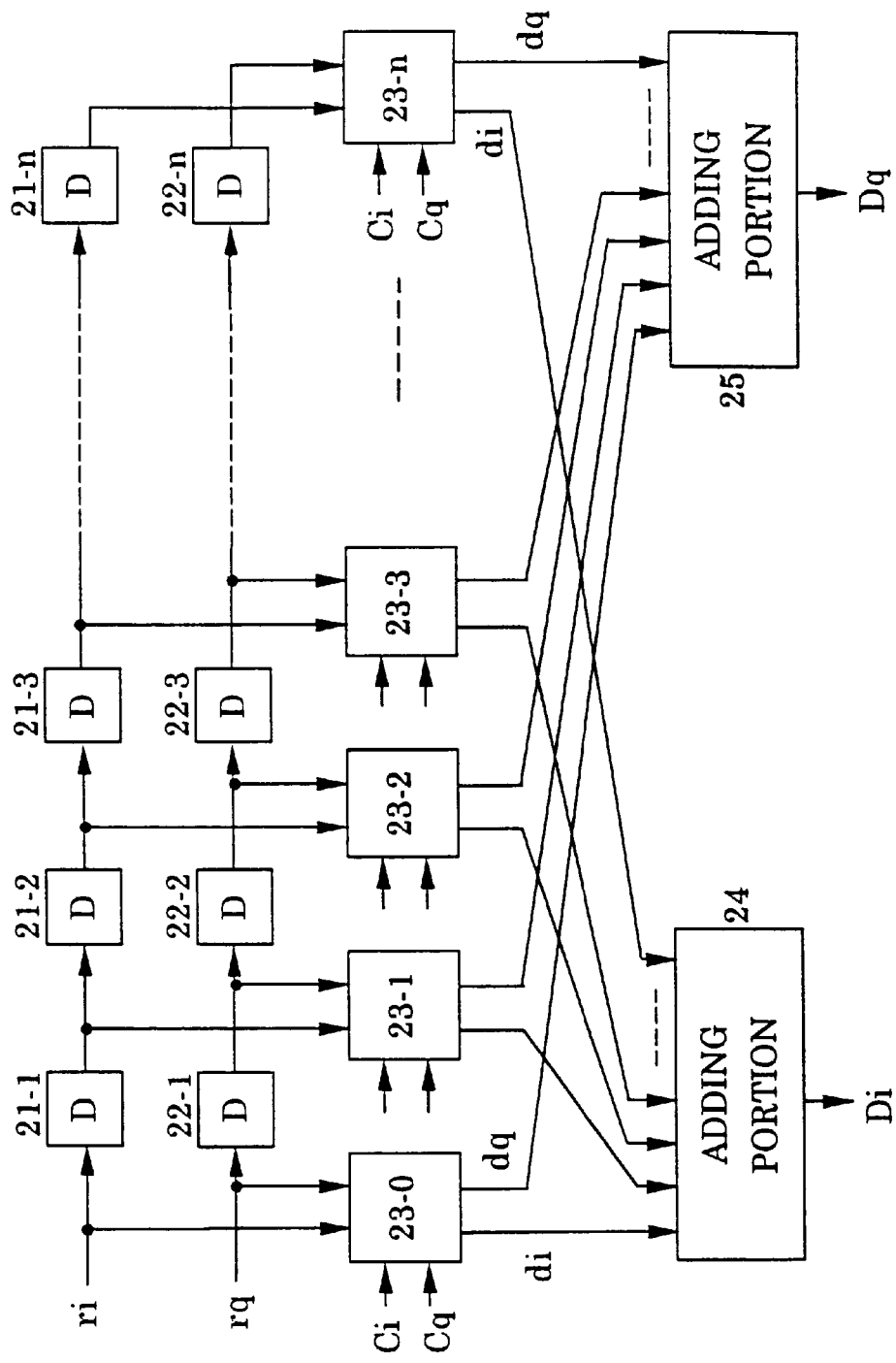
FIG. 6 illustrates a matched-filter-type despreading portion in the first embodiment of the present invention.

FIG. 6 shows a general arrangement of a matched-filter-type despreading portion in the first embodiment of the present invention. In the CDMA receiving apparatus in the first embodiment of the present invention, the despreading portion 10 shown in FIG. 5 comprises the matched-filter-type despreading portion. The matched-filter-type despreading portion includes delaying elements (D) 21-1 through 21-n and 22-1 through 22-n, each for delaying an input signal by the time for one chip, the delaying elements forming an in-phase shift register and a quadrature shift register, respectively, selector portions 23-0 through 23-n, an in-phase adding portion 24, and a quadrature adding portion 25.

A demodulated in-phase signal ri is input to the in-phase shift register and a demodulated quadrature signal rq is input to the quadrature shift register. Then, these signals are shifted every chip period. The demodulated in-phase signal ri, the demodulated quadrature signal rq, the signals output from the delaying elements 21-1 through 21-n of the in-phase shift register and the signals output from the delaying elements 22-1 through 22-n of the quadrature shift register are input to the selector portions 23-0 through 23-n, respectively. Despreading codes Ci and Cq for the in-phase signal and the quadrature signal, respectively, are input to each of the selector portions 23-0 through 23-n. In-phase signals di selected in accordance with the despreading codes Ci and Cq are input to the in-phase adding portion 24, are added, and the in-phase signal Di is obtained. Orthogonal signals dq selected in accordance with the despreading codes Ci and Cq are input to the quadrature adding portion 25, are added, and the quadrature signal Dq is obtained.

Figure 7:
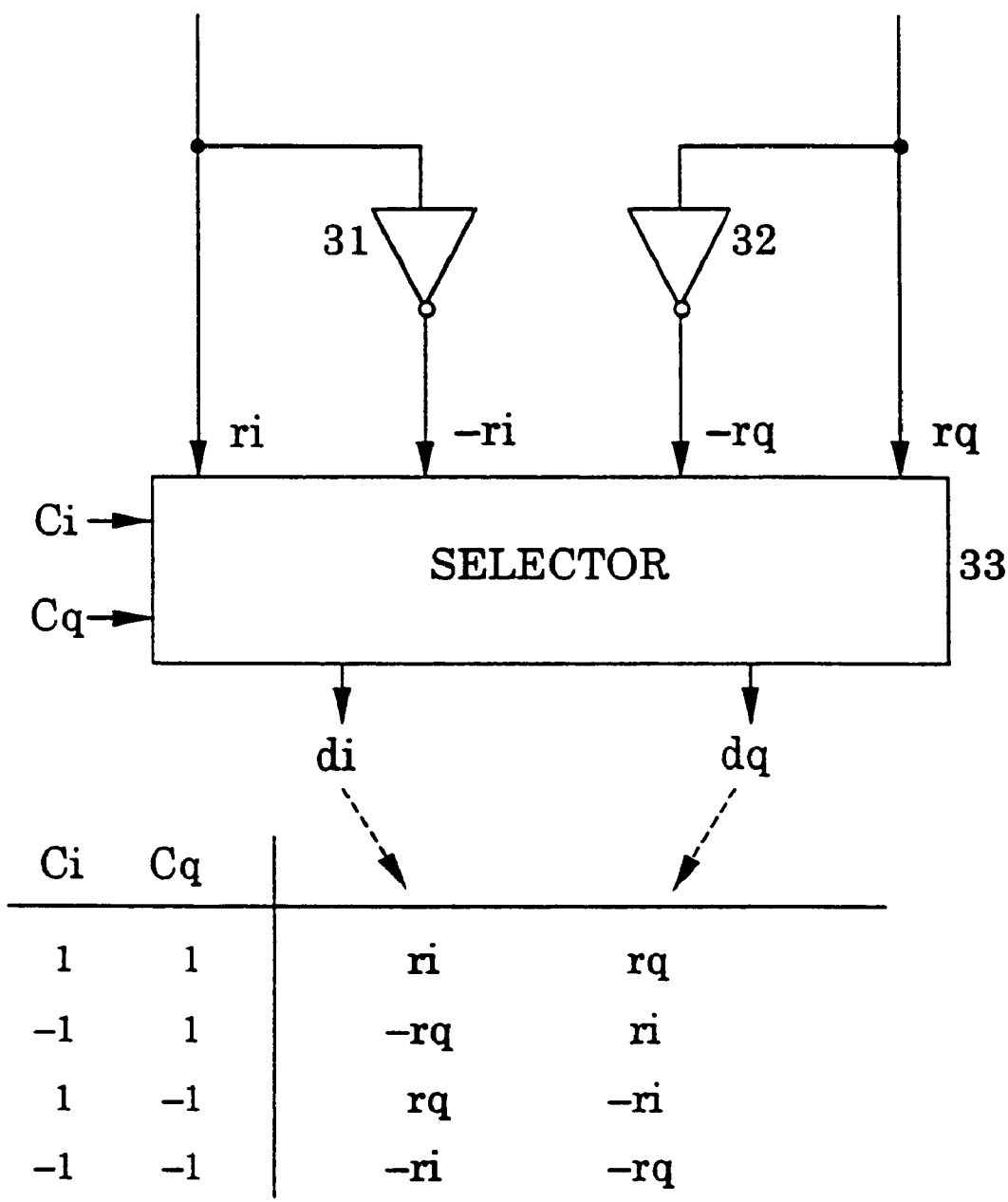
FIG. 7 illustrates a selector portion in the first embodiment of the present invention.

Each of the selector portions 23-0 through 23-n has, for example, an arrangement shown in FIG. 7. The arrangement includes an inverter 31 for inverting the sign of the demodulated in-phase signal ri and outputting the inverted in-phase signal $-ri$, an inverter 32 for inverting the sign of the demodulated quadrature signal rq and outputting the inverted quadrature signal $-rq$, and a selector 33. The selector 33 has the demodulated in-phase signal ri, the inverted in-phase signal $-ri$, the demodulated quadrature signal rq and the inverted quadrature signal $--rq$ input thereto. Then, the selector 33 selects the signals therefrom in accordance with the despreading codes Ci and Cq, and outputs the selected in-phase signal di and the selected quadrature signal dq.

The selection logic of the selector 33 in accordance with the despreading codes Ci and Cq is, for example, as follows:

When the despreading codes Ci=1 and Cq=1, the selected outputs di=ri and dq=rq. This case corresponds to the case where the phase rotation angle is 0. When the despreading codes Ci=$-1$ and Cq=1, the selected outputs di=$-$rq and dq=ri. This case corresponds to the case where the phase rotation angle is $\pi/2$. When the despreading codes Ci=1 and Cq=$-1$, the selected outputs di=rq and dq=$-$ri. This case corresponds to the case where the phase rotation angle is $-\pi/2$. When the despreading codes Ci=$-1$ and Cq=$-1$, the selected outputs di=$-$ri and dq=$-$rq. This case corresponds to the case where the phase rotation angle is $\pi$. The selector 33 having such a selection logic as that described above can be easily embodied using a relatively simple logic gate circuit. Instead, it is also possible to easily embody such a selection logic through determination processing or the like performed by a digital signal processor (DSP).

The in-phase signals di selected in accordance with the despreading codes Ci and Cq through the selector portions 23-0 through 23-n shown in FIG. 6 and output therefrom are input to the in-phase adding portion 24, are added therethrough, and become the in-phase signal Di. The quadrature signals dq selected in accordance with the despreading codes Ci and Cq through the selector portions 23-0 through 23-n and output therefrom are input to the quadrature adding portion 25, are added therethrough, and become the quadrature signal Di.

The in-phase signal Di and the quadrature signal Dq are output from the despreading portion 10 which is the matched-filter-type despreading portion described above in the first embodiment. The in-phase signal Di and the quadrature signal Dq are then input to the fading compensating portion 11 which compensates the phase rotation included in the signals, output from the despreading portion 10, occurring due to the fading in the propagation path and the phase rotations included in the signals, output from said despreading portion 10, occurring in the despreading portion 10. Then, the in-phase signal and the quadrature signal output from the fading compensating portion 11 are input to the determining and outputting portion 12 which performs a determination using the levels of these signals or the like and outputs a series of bits. The series of bits is transferred to a subsequent circuit (not shown in FIG. 5).

Thus, the despreading portion 10 in the first embodiment of the present invention includes the shift registers, selector portions and adding portions, but does not include a multiplier which is needed in the related art. Thereby, the arrangement of the despreading portion 10 is simple. Further, when the functions of the despreading portion 10 are embodied by calculation processing functions of a digital signal processor (DSP), because the amount of processing is reduced, high-speed processing and low power consumption can be achieved.

Figure 8:
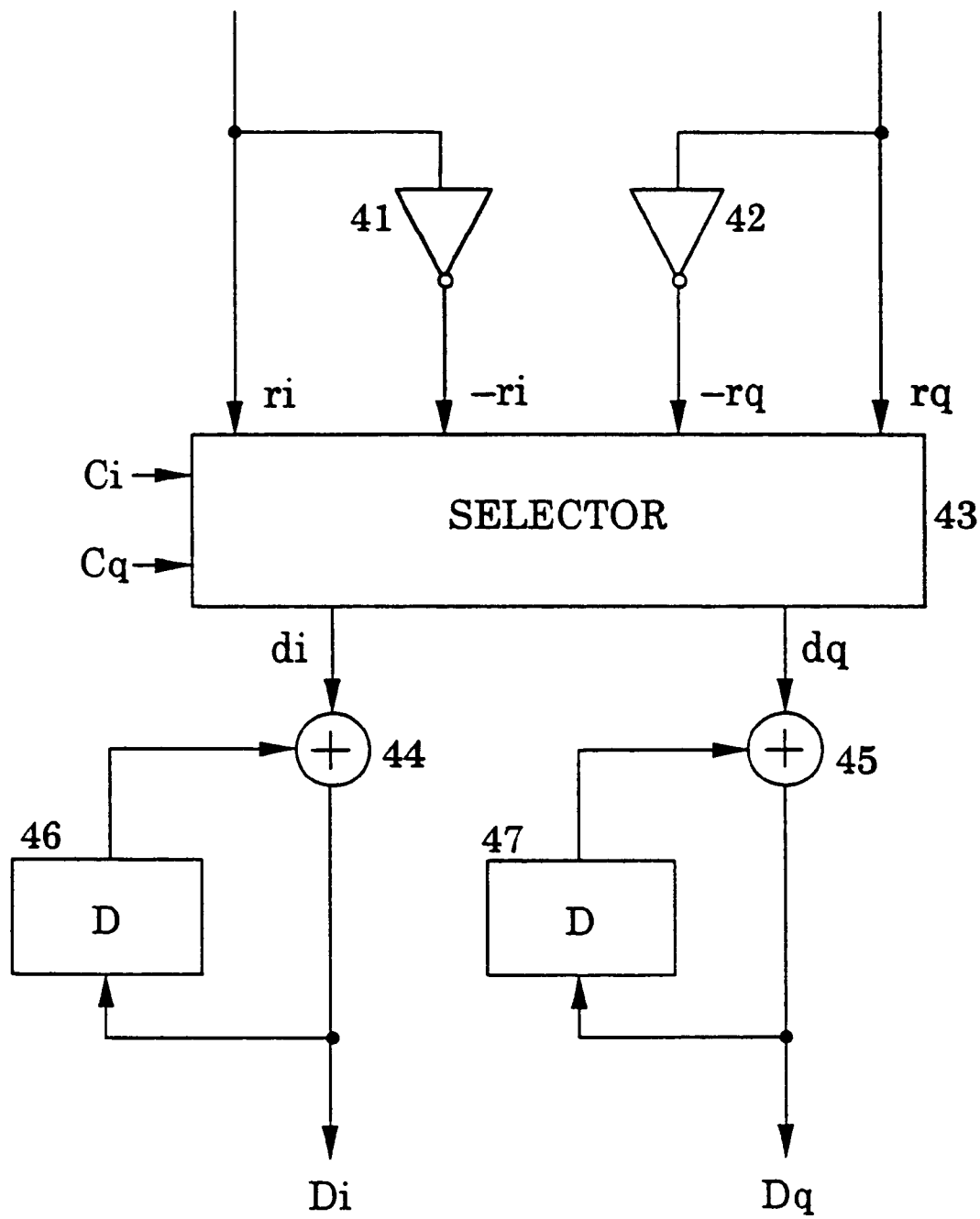
FIG. 8 illustrates a sliding-correlator-type despreading portion in the second embodiment of the present invention.

FIG. 8 illustrates a sliding-correlator-type despreading portion in a second embodiment of the present invention. In the second embodiment of the present invention, the despreading portion 10 shown in FIG. 5 comprises the sliding-correlator-type despreading portion, instead of the arrangement shown in FIG. 6. The despreading portion comprising the sliding-correlator-type despreading portion includes inverters 41, 42, a selector 43, adders 44, 45, and delaying elements (D) 46, 47 each for delaying an input signal by the time for one chip. The inverters 41, 42 and selector 43 have arrangements and functions for performing logical operations which correspond to those of the inverters 31, 32 and selector 33 shown in FIG. 7, respectively.

The selected in-phase signal di is output from the selector 43 every chip period and is input to the adder 44. The selected in-phase signal di, which was last output from the selector 43, underwent addition through the adder 44 prior, by one chip, to the selected signal di currently output from the selector 43 and is input to the adder 44 via the delaying element 46, is added to the currently output selected in-phase signal di through the adder 44. Then, after the period for one bit, the addition result is output from the adder 44 as the in-phase signal Di. Similarly, the selected quadrature signal dq is output from the selector 43 every chip period and is input to the adder 45. The selected quadrature signal dq, which was last output from the selector 43, underwent addition through the adder 45 prior, by one chip, to the selected quadrature signal dq currently output from the selector 43 and is input to the adder 45 via the delaying element 47, is added to the currently output selected quadrature signal dq through the adder 45. Then, after the period for one bit, the addition result is output from the adder 45 as the quadrature signal Dq.

Also in the CDMA receiving apparatus in the second embodiment, the despreading portion which is the sliding-correlator-type despreading portion does not include a multiplier. Accordingly, the circuit arrangement is simple, and also, because calculations to be performed are only additions, the amount of processing can be reduced. Further, in comparison to the-matched-filter-type despreading portion shown in FIG. 6, the arrangement is simple.

Thus, the present invention relates to the CDMA receiving apparatus which receives and demodulates the direct sequence CDMA signal. The direct sequence CDMA signal is obtained through the QPSK spreading modulation. The demodulators 4, 5 perform the coherent detection of the input direct sequence CDMA signal. The signals output from the demodulators 4, 5 are converted into the digital signals through the A-D converters 8, 9, respectively. These digital signals are the demodulated in-phase signal ri and the demodulated quadrature signal rq. The selector 13 of the despreading portion 10 selects the in-phase and quadrature signals di, dq from the demodulated in-phase and quadrature signals ri, rq and the inverted in-phase and quadrature signals –ri, –rq, in accordance with the despreading codes Ci, Cq, and outputs the selected signals di and dq. The inverted in-phase and quadrature signals –ri, –rq are obtained as a result of the signs of the demodulated in-phase and quadrature signals ri, rq being inverted. Thus, the CDMA receiving apparatus according to the present invention does not need a multiplier. Accordingly, the arrangement of the apparatus is simple. Further, when calculation functions of a DSP or the like are used for embodying the CDMA receiving apparatus, the amount of calculation processing can be reduced.

The present invention is not limited to the above-described embodiments, and variations and modifications may be made without departing from the scope of the present invention.

The contents of the basic Japanese Patent Application No.9-290729, filed on Oct. 23, 1997, are hereby incorporated by reference.

What is claimed is:

1. A CDMA receiving apparatus, receiving a direct sequence CDMA signal produced through QPSK spreading modulation, performing coherent detection of the direct sequence CDMA signal, and despreading the signals, obtained through the coherent detection, through a despreading portion, wherein said despreading portion comprises a selector portion, said selector portion selecting signals, as a demodulated and despread in-phase output signal and a demodulated and despread quadrature output signal, in accordance with despreading codes, from demodulated in-phase and quadrature signals obtained through the coherent detection, and inverted in-phase and quadrature signals obtained as a result of the signs of the demodulated in-phase and quadrature signals being inverted.

2. The CDMA receiving apparatus, according to claim 1, wherein said despreading portion comprises:

an in-phase shift register for shifting the demodulated in-phase signal every chip period;

a quadrature shift register for shifting the demodulated quadrature signal every chip period;

selectors, each for having signals, output from a respective element of said in-phase shift register and a respective element of said quadrature shift register, and signals, obtained as a result of the signs of the signals output from the respective element of said in-phase shift register and the respective element of said quadrature shift register, being inverted, input thereto, selecting signals as a selected in-phase signal and a selected quadrature signal therefrom, and outputting the thus-selected signals;

an in-phase adding portion for adding the selected in-phase signals and outputting the addition result as the demodulated and despread in-phase output signal; and a quadrature adding portion for adding the selected quadrature signals and outputting the addition result as the demodulated and despread quadrature output signal.

3. The CDMA receiving apparatus, according to claim 1, wherein said despreading portion comprises:

a selector for having the demodulated in-phase signal and the demodulated quadrature signal, and an inverted quadrature signal and an inverted quadrature signal obtained as a result of the signs of the demodulated in-phase signal and the demodulated quadrature signal being inverted input thereto, selecting signals therefrom, as a selected in-phase signal and a selected quadrature signal, in accordance with the despreading codes, and outputting the thus-selected signals; and adding portions for adding the selected in-phase signal and adding the selected quadrature signal during the period for one bit, and outputting the addition results as the demodulated and despread in-phase output signal and the demodulated and despread quadrature output signal.

4. A CDMA receiving apparatus, comprising:

an antenna through which a direct sequence CDMA signal, obtained through QPSK spreading modulation, is input;

a high-frequency amplifier which amplifies the input signal;

a bandpass filter which removes unnecessary frequency band components from the amplified signal;

a carrier wave generating portion which generates a carrier wave;

a first demodulator which has the carrier wave input thereto, demodulates the signal output from said bandpass filter and outputs a demodulated in-phase signal;

a phase shifter which shifts the phase of the carrier wave by $\pi/2$;

a second demodulator which has the carrier wave input thereto through said phase shifter, demodulates the signal output from said bandpass filter and outputs a demodulated quadrature signal;

a first A-D converter which converts the demodulated in-phase signal into a digital demodulated in-phase signal;

a second A-D converter which converts the demodulated quadrature signal into a digital demodulated quadrature signal;

a despreading portion which comprises a selector portion which selects signals, as a demodulated and despread in-phase output signal and a demodulated and despread quadrature output signal, in accordance with despreading codes, from the digital demodulated in-phase signal and the digital demodulated quadrature signal, and an inverted in-phase signal and an inverted quadrature signal obtained as a result of the signs of the digital demodulated in-phase signal and the digital demodulated quadrature signal being inverted;

a fading compensating portion which compensates the phase rotations, included in the demodulated and despread in-phase output signal and the demodulated and despread quadrature output signal, occurring due to the fading in the propagation path and the phase rotations, included in the demodulated and despread in-phase output signal and the demodulated and despread quadrature output signal, occurring in said despreading portion; and a determining and outputting portion which performs a determination, using the levels of these signals output from said fading compensating portion, or the like, and outputs a series of bits.

5. A CDMA receiving apparatus, comprising:

means for inputting a direct sequence CDMA signal, obtained through QPSK spreading modulation;

high-frequency amplifying means for amplifying the input signal;

bandpass filtering means for removing unnecessary frequency band components from the amplified signal;

carrier wave generating means for generating a carrier wave;

first demodulating means for having the carrier wave input thereto, demodulating the signal output from said bandpass filtering means and outputting a demodulated in-phase signal;

phase shifting means for shifting the phase of the carrier wave by $\pi/2$;

second demodulating means for having the carrier wave input thereto via said phase shifting means, demodulating the signal output from said bandpass filtering means and outputting a demodulated quadrature signal;

first A-D converting means for converting the demodulated in-phase signal into a digital demodulated in-phase signal;

second A-D converting means for converting the demodulated quadrature signal into a digital demodulated quadrature signal;

despreading means which comprises selecting means for selecting signals, as a demodulated and despread in-phase output signal and a demodulated and despread quadrature output signal, in accordance with despreading codes, from the digital demodulated in-phase signal and the digital demodulated quadrature signal, and an inverted in-phase signal and an inverted quadrature signal obtained as a result of inverting the signs of the digital demodulated in-phase signal and the digital demodulated quadrature signal;

fading compensating means for compensating the phase rotations, included in the demodulated and despread in-phase output signal and the demodulated and despread quadrature output signal, occurring due to the fading in the propagation path and the phase rotations, included in the demodulated and despread in-phase output signal and the demodulated and despread quadrature output signal, occurring in said despreading portion; and determining and outputting means for performing a determination using the levels of these signals output from said fading compensating portion, or the like, and outputting a series of bits.

* * * * *